United States Patent
Abevi et al.

(10) Patent No.: US 9,759,298 B2
(45) Date of Patent: Sep. 12, 2017

(54) ROLLER SCREW MECHANISM

(71) Applicants: Folly Abevi, Chambéry (FR); Christian Boch, Chambéry (FR)

(72) Inventors: Folly Abevi, Chambéry (FR); Christian Boch, Chambéry (FR)

(73) Assignee: AKTIEBOLAGET SKF, Gothenburg (SE)

( * ) Notice: Subject to any disclaimer, the term of this patent is extended or adjusted under 35 U.S.C. 154(b) by 70 days.

(21) Appl. No.: 14/819,477

(22) Filed: Aug. 6, 2015

(65) Prior Publication Data

US 2016/0053874 A1 Feb. 25, 2016

(30) Foreign Application Priority Data

Aug. 21, 2014 (FR) ..................................... 14 57921

(51) Int. Cl.
  *F16H 1/24* (2006.01)
  *F16H 25/22* (2006.01)

(52) U.S. Cl.
  CPC .............................. *F16H 25/2252* (2013.01)

(58) Field of Classification Search
  CPC .... F16H 25/2266; F16H 25/2252; F16H 1/24; F16H 55/02
  See application file for complete search history.

(56) References Cited

U.S. PATENT DOCUMENTS

| | | | | |
|---|---|---|---|---|
| 2,683,379 A | * | 7/1954 | Strandgren | ......... F16H 25/2252 74/424.92 |
| 3,173,304 A | * | 3/1965 | Strandgren | ......... F16H 25/2252 74/409 |
| 3,406,584 A | * | 10/1968 | Roantree | ............. F16H 25/2252 74/424.7 |
| 3,434,357 A | * | 3/1969 | Roantree | ............. F16H 25/2266 49/360 |
| 4,648,285 A | * | 3/1987 | Carson | ................ F16H 25/2252 74/424.75 |
| 5,992,258 A | * | 11/1999 | Kawase | .............. F16H 25/2252 74/424.75 |
| 6,026,696 A | * | 2/2000 | Hehl | ....................... B29C 45/07 74/411 |

(Continued)

FOREIGN PATENT DOCUMENTS

FR 2980545 A1 3/2013
FR 2984443 A1 6/2013

*Primary Examiner* — Zakaria Elahmadi
(74) *Attorney, Agent, or Firm* — Bryan Peckjian; SKF USA Inc. Patent Dept.

(57) ABSTRACT

A roller screw mechanism comprising a screw, provided with an outer thread, a nut positioned around and coaxially to the screw, the nut being provided with an inner thread, and a plurality of rollers inserted between the screw and the nut, each comprising an outer thread engaged with the outer thread of the screw and with the inner thread of the nut. Each of the threads of the screw, rollers and nut comprise first and second axially opposite flanks, respectively forming a first and second angle with a plane perpendicular to the central axis of the screw, the first and second flanks of each thread of the rollers respectively being in contact with the first and second flanks of the nut's thread and with the first and second flanks of the screw's thread. The value of the first angle is different from the value of the second angle.

11 Claims, 2 Drawing Sheets

(56) References Cited

U.S. PATENT DOCUMENTS

| | | | |
|---|---|---|---|
| 2003/0203068 A1* | 10/2003 | Wohlrab | B29C 45/66 425/589 |
| 2005/0160856 A1* | 7/2005 | Sugitani | F16H 25/2252 74/424.92 |
| 2013/0074622 A1* | 3/2013 | Buvril | F16H 25/12 74/89.23 |
| 2013/0152716 A1* | 6/2013 | Buvril | F16H 25/2252 74/89.23 |
| 2016/0091068 A1* | 3/2016 | Abevi | F16H 25/2252 74/424.92 |

* cited by examiner

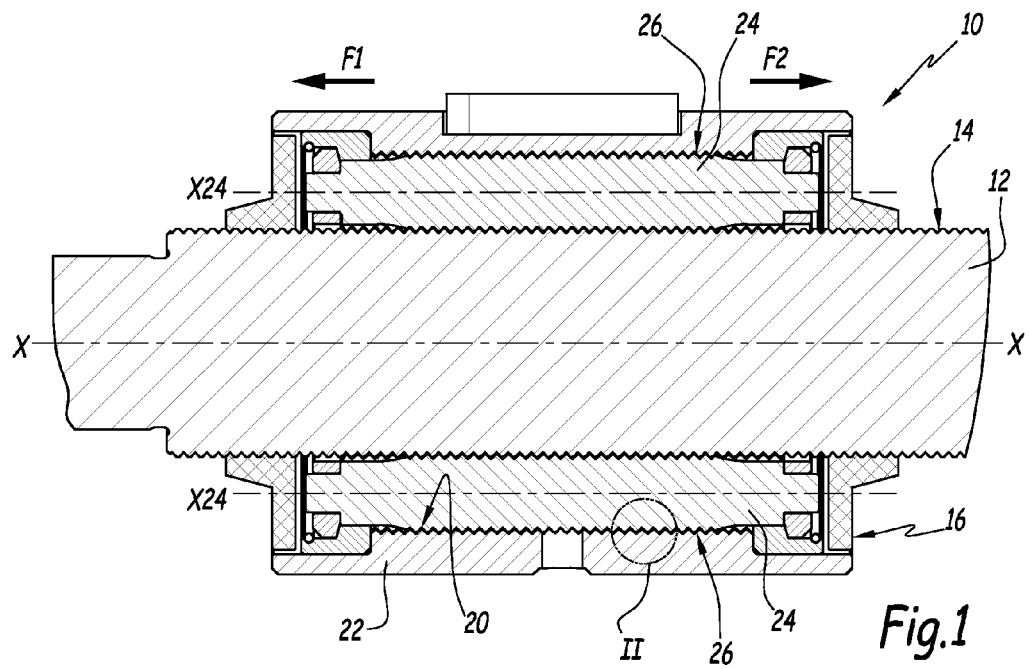
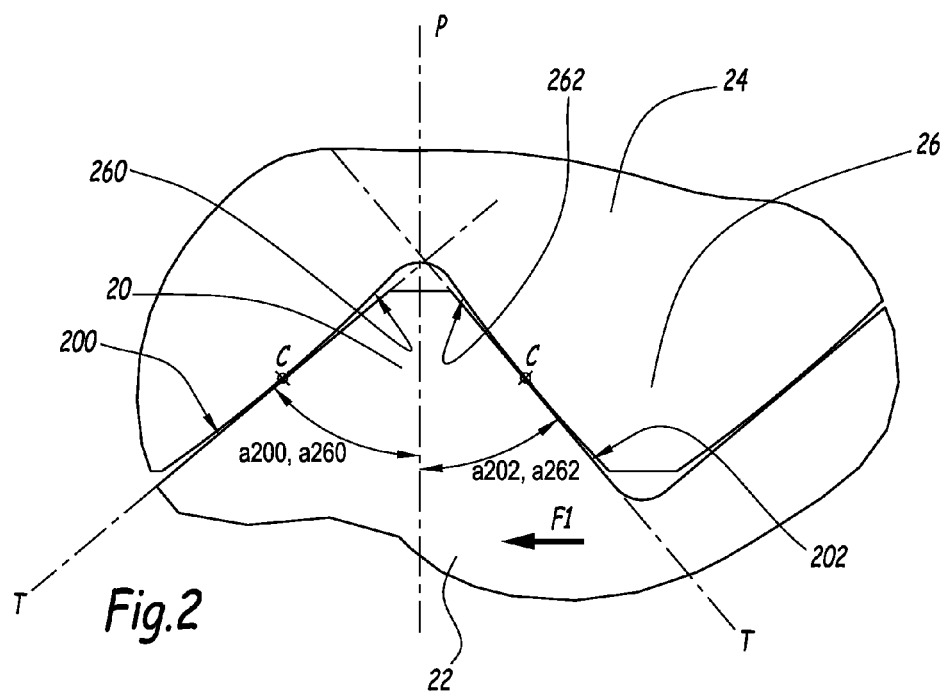

ROLLER SCREW MECHANISM

CROSS REFERENCE TO RELATED APPLICATIONS

This is a Non-Provisional Patent Application, filed under the Paris Convention, claiming the benefit of French (FR) Patent Application Number 1457921, filed on 21 Aug. 2014 (21.08.2014), which is incorporated herein by reference in its entirety.

TECHNICAL FIELD OF THE INVENTION

The present invention relates to the field of roller screw mechanisms making it possible to convert a rotational movement into a linear translational movement and vice versa.

PRIOR ART

Such a mechanism is provided with a screw comprising an outer thread, a nut positioned around the screw and comprising an inner thread, and a plurality of longitudinal rollers comprising an outer thread engaged with the outer and inner threads of screw and the nut, respectively. Such a mechanism is in particular described in FR-A-2,984,443.

The current roller screw mechanisms are not suitable for applications in which the load applied axially is greater in one movement direction than the other, as is the case for plastic injection presses, for example. Indeed, the current roller screws have threads whereof the flanks are symmetrical, which means that the pressure that can be withstood is identical in both translation directions of the mechanism.

BRIEF SUMMARY OF THE PRESENT INVENTION

The invention more particularly aims to resolve these drawbacks by proposing a new roller screw mechanism allowing the application to systems involving greater forces in one translation direction than the other.

To that end, the invention relates to a roller screw mechanism comprising:
- a screw provided with an outer thread,
- a nut positioned around and coaxially to the screw, the nut being provided with an inner thread, and
- a plurality of rollers inserted between the screw and nut and each comprising an outer thread engaged with the outer thread of the screw and with the inner thread of the nut,
- each of the threads of the screw, rollers and nut comprising first and second axially opposite flanks, respectively forming a first and second angle with a plane perpendicular to the central axis of the screw, the first and second flanks of each thread of the rollers respectively being in contact with the first and second flanks of the thread of the nut and with the first and second flanks of the thread of the screw. This mechanism is characterized in that the value of the first angle is different from the value of the second angle.

Owing to the invention, the roller screw mechanism makes it possible to transmit a greater force in one translation direction than the other, which is advantageous for certain applications.

According to advantageous but optional aspects of the invention, such a roller screw mechanism may incorporate one or more of the following features, considered in any technically allowable combination:
- The difference between the value of the first angle and the value of the second angle is at least 15% of the value of the first angle.
- The difference between the value of the first angle and the value of the second angle is at most 40% of the value of the first angle.
- The first and/or second flanks of the thread of the rollers have a convex profile.
- The first and/or second flanks of the thread of the rollers have a rectilinear profile.
- The flanks of the thread of the nut have a rectilinear profile.
- The flanks of the thread of the nut have a concave profile.
- The flanks of the thread of the screw are concave, rectilinear or convex.
- The sum of the respective values of the first angle and the second angle is 90°.
- The value of the first angle is 50°, and the value of the second angle is 40°.
- The flanks of the threads of the screw, rollers and nut whereof the angles relative to the plane perpendicular to the central axis of the screw are the smallest, are suitable for transmitting a greater axial force than the other flanks.

BRIEF DESCRIPTION OF THE DRAWINGS

The invention will be better understood, and other advantages thereof will appear more clearly, in light of the following description of a roller screw according to its principle, provided as a non-limiting example in reference to the appended drawings, in which:

FIG. 1 is a cross-sectional view of a roller screw mechanism according to the invention;

FIG. 2 is an enlarged view of detail II in FIG. 1;

DETAILED DESCRIPTION OF THE INVENTION

Figure 3:
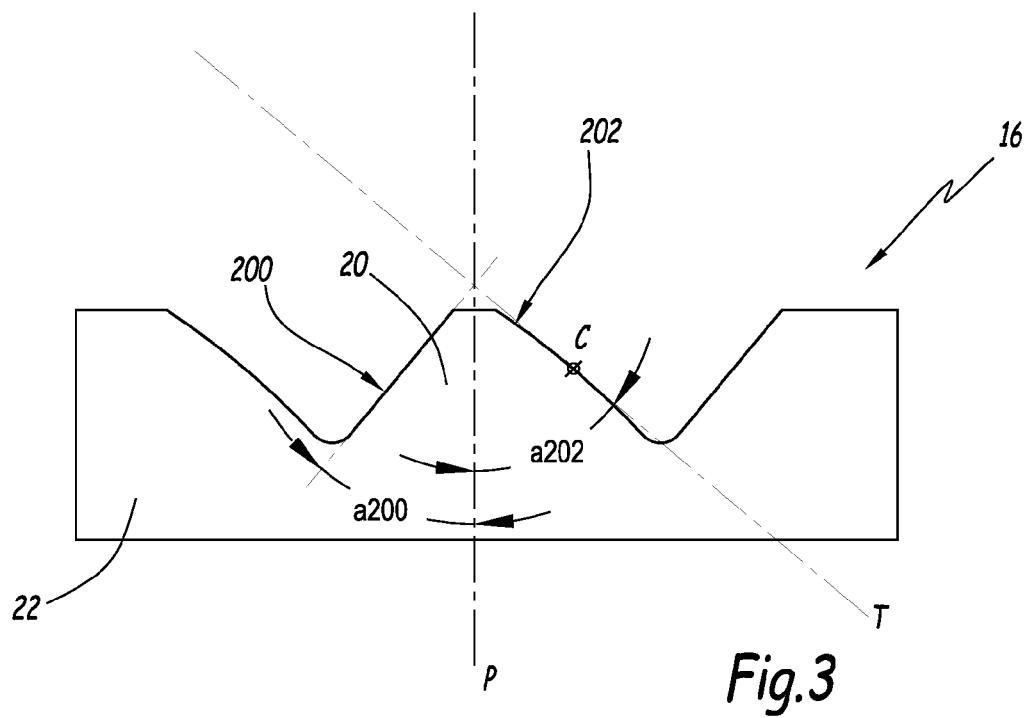
FIG. 3 is a view similar to FIG. 2 of a thread of a nut belonging to a roller screw mechanism according to a first alternative of the invention.

In FIGS. 1 and 2, a roller screw mechanism, referenced 10 as a whole, comprises a screw 12, centered on a central axis X-X', provided with an outer thread 14. A nut 16 is mounted coaxially around the screw 12 and is provided with an inner thread 20, arranged on a tubular part 22 of the nut 16. The roller screw mechanism 10 also comprises a plurality of rollers 24 extending along respective central axes X24 parallel to the axis X-X' and positioned radially between the screw 12 and the tubular part 22 of the nut 16.

The rollers 24 are identical to one another and distributed regularly around the screw 12. Each roller 24 comprises an outer thread 26 engaged with the thread 14 of the screw 12 and with the thread 20 of the nut 16.

The thread 20 of the nut 16 comprises a first flight 20 and a second flank 202 that are axially opposite one another and respectively form a first angle a200 and a second angle a202 with a plane P perpendicular to the axis X-X'.

The thread 26 of the rollers 24 comprises a first flank 260, which is in contact with the first flank 200 of the thread 20 and a second flank 262, which is in contact with the second flank 202 of the thread 20. The first and second flanks 260 and 262 are axially opposite and respectively form a first angle a260 and a second angle a262 with the plane P.

The thread 14 of the screw 12 has a geometry similar to that of the thread 20 and comprises first and second flanks that are not shown, which are axially opposite one another and are respectively in contact with the first flank 260 and the second flank 262. The flanks of the thread 14 form angles relative to the plane P that have values identical to the angles a200 and a202. The flanks of the thread 14 can be concave, rectilinear or convex.

The values of the angles a200, a202, a260 and a262 define the profile of the threads 14, 20 and 26. The values of the angles a200 and a260 are equal. The values of the angles a202 and a262 are equal.

The rotation of the screw 12 around its axis X-X' results, depending on the direction of rotation, in activating a translational movement along the axis X-X' of the nut 16, indicated by arrows F1 and F2. Alternatively, the rotation of the nut 16 around its axis X-X' results, depending on the direction of rotation, in activating a translational movement along the axis X-X' of the screw 12.

Certain applications in which rollers screw mechanisms are used, in particular plastic injection presses, require the application of greater forces in one direction of translation of the nut 16 than the other. In particular, the force to be transmitted is greater during the pressing phase of the press, while the force to be transmitted is relatively low when the press returns to its initial position.

To that end, the flanks of the threads 14, 20 and 26 are asymmetrical, i.e., the angular profiles of the flanks of the threads 14, 20 and 26 are different. Advantageously, the difference between the value of the angles a200 and a260 and the value of the angles a202 and a262 is at least 15%, preferably at most 40% of the value of the angles a200 and a260.

In the example, the value of the angles a200 and a260 is strictly greater than the value of the angles a202 and a262, such that the flanks 202 and 262 are more inclined relative to the axis X-X' than the flanks 200 and 260. As a result, the flanks 202 and 262 allow the transmission of a greater axial force than the flanks 200 and 260, which in turn favor better sliding. The transmission of forces allowed by this geometry is greater in the direction of the arrow F1, since the flanks 202, i.e., the parts of the nut 16 on which the movement forces are exerted, are opposed along the axis X-X' to the movement direction.

The thread 14 of the screw 12 has a geometry similar to that of the thread 20, the screw 12 therefore being capable of exerting greater torques in the direction of rotation corresponding to movement in the direction of the arrow F1.

Preferably, in order to keep the same thread profile depth, the sum of the angles a200 and a202, or of the angles a260 and a262, is equal to 90°. As an example, the angles a200 and a260 can each be equal to 50°, while the angles a262 and a202 can each be equal to 40°.

In the illustrated example, the flanks 260 and 262 have a convex profile, while the flanks 200 and 202 have a rectilinear profile. For the flanks 260 and 262, the angles a260 and a262 are formed by the tangent T to the flanks 260 and 262 passing through the point of contact C between the flanks 260 and 200 or between the flanks 262 and 202.

According to one alternative of the invention shown in FIG. 3, in which only the thread 20 is shown, the flank 202 has a convex profile. In such a case, the flanks 262 can have a convex or rectilinear profile. In an alternative that is not shown, each of the flanks 200 and 202 can be convex.

Figure 4:
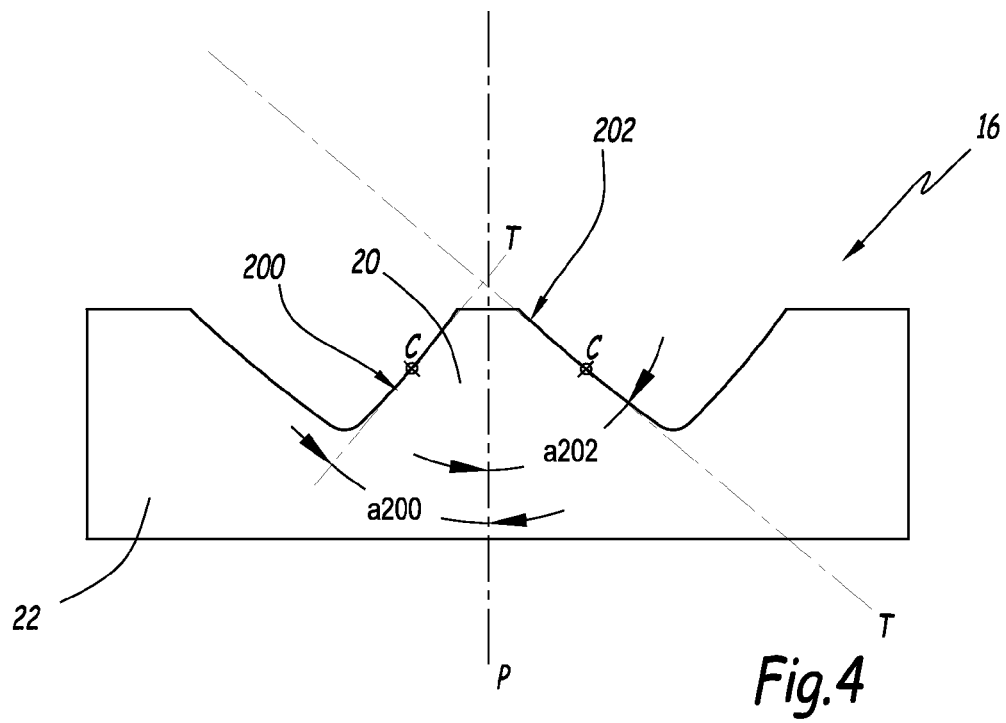
FIG. 4 is a view similar to FIG. 3, of a thread of a nut belonging to a roller screw according to a second alternative of the invention.

According to another alternative of the invention shown in FIG. 4, in which only the thread 20 is illustrated, the flanks 200 and 202 have a concave profile. In such a case, the flanks 260 and 262 can have a convex profile.

In an alternative that is not shown, the flanks 260 and 262 of the thread 26 of the rollers 24 can have a convex or rectilinear profile.

The features of the embodiments and alternatives described above may be combined to obtain new embodiments of the invention.

The invention claimed is:

1. A roller screw mechanism, comprising:
    a screw provided with an outer thread,
    a nut positioned around and coaxially to the screw, the nut being provided with an inner thread, and
    a plurality of rollers inserted between the screw and the nut and each comprising an outer thread engaged with the outer thread of the screw and with the inner thread of the nut,
    each of the threads of the screw, rollers and nut comprising first and second axially opposite flanks, respectively forming a first angle and second angle with a plane perpendicular to the central axis of the screw,
    while travelling along the outer thread of the rollers the outer thread of the rollers alternatingly contact the first and second flanks of the inner thread of the nut and the first and second flanks of the outer thread of the screw such that two sequential contacts of the outer thread of the rollers include: (1) the first and second flanks of the outer thread of the rollers respectively constantly contacting the first and second flanks of the inner thread of the nut; and (2) the first and second flanks of the outer thread of the roller respectively constantly contacting the first and second flanks of the outer thread of the screw,
    wherein the value of the first angle is different from the value of the second angle.

2. The mechanism according to claim 1, wherein a difference between the value of the first angle and the value of the second angle is at least 15% of the value of the first angle.

3. The mechanism according to claim 2, wherein the difference between the value of the first angle and the value of the second angle is at most 40% of the value of the first angle.

4. The mechanism according to claim 1, wherein at least one of the first flank and the second flank of the outer thread of the rollers has a convex profile.

5. The mechanism according to claim 1, wherein at least one of the first flank and the second flank of the outer thread of the rollers has a rectilinear profile.

6. The mechanism according to claim 1, wherein the flanks of the inner thread of the nut have a rectilinear profile.

7. The mechanism according to claim 1, wherein the flanks of the inner thread of the nut have a concave profile.

8. The mechanism according to claim 1, wherein the flanks of the outer thread of the screw have one of: a concave profile, a rectilinear profile, or convex profile.

9. The mechanism according to claim 1, wherein a sum of the respective values of the first angle and the second angle is 90°.

10. The mechanism according to claim 9, wherein the value of the first angle is 50°, and the value of the second angle is 40°.

11. The mechanism according to claim 1, wherein one of the first and the second flanks of the threads of the screw, rollers and nut whereof the angles relative to the plane perpendicular to the central axis of the screw are the smallest, are suitable for transmitting a greater axial force than the other one of the first and second flanks.

* * * * *